United States Patent [19]

Fox

[11] 4,383,589

[45] May 17, 1983

[54] PNEUMATIC DRIVE SYSTEM FOR LAND VEHICLES

[76] Inventor: Hilbert V. Fox, Rte. 1, Box 134, Fayetteville, W. Va. 25840

[21] Appl. No.: 207,024

[22] Filed: Nov. 14, 1980

[51] Int. Cl.³ .............................................. B60K 9/00
[52] U.S. Cl. ..................................... 180/165; 60/407; 60/412; 91/522; 180/302
[58] Field of Search ............... 180/165, 302, 303, 308, 180/241, 247, 242; 60/370, 412, 407; 137/595, 594; 91/522, 523, 524

[56] References Cited

U.S. PATENT DOCUMENTS

| | | | |
|---|---|---|---|
| 1,313,081 | 8/1919 | Finney | 180/302 X |
| 2,341,940 | 2/1944 | Millington | 137/595 X |
| 2,471,109 | 5/1949 | Hunt | 60/407 X |
| 3,509,721 | 5/1970 | Crawford | 180/308 X |
| 3,579,980 | 5/1971 | Firth et al. | 180/242 X |
| 3,924,959 | 12/1975 | Bandy | 180/302 X |
| 4,043,126 | 8/1977 | Santos | 180/302 X |

FOREIGN PATENT DOCUMENTS

| | | | |
|---|---|---|---|
| 557233 | 11/1943 | United Kingdom | 60/412 |
| 1249362 | 10/1971 | United Kingdom | 180/242 |

Primary Examiner—Robert J. Spar
Assistant Examiner—Donald W. Underwood

[57] ABSTRACT

The present invention utilizes a power system based upon the use of compressed air. Each wheel of the vehicle is provided with a motor which is operated by compressed air from a respective storage tank through a system of valves and hydraulic or fluid pressure lines. The rotation of each wheel is also utilized to drive air compressors which may recapture some or all of the air which is exhausted from each motor and additionally to compress and store air brought in from outside of the vehicle during its motion. The present invention can be adapted for two-wheel drive or four-wheel drive.

The drive units for each wheel are substantially identical. The rear units are mounted on fixed axles whereas the front units are mounted on an axle having a universal joint therein and each wheel is mounted by means of a ball joint to a suspension frame which in turn is secured to the vehicle frame. The suspension means for all wheels can be of a well-known type such as coil springs, leaf springs and other well-known suspension and load cushioning devices now in use. The rear wheel units are mounted on suspension systems similar to that for the front wheel which systems are in turn secured to the main vehicle frame and the wheels are suspended within the suspension frames with load cushioning devices similar to those on the front wheels.

7 Claims, 9 Drawing Figures

PNEUMATIC DRIVE SYSTEM FOR LAND VEHICLES

FIELD OF INVENTION

The present invention is in the field of power plants for land vehicles and more particularly in that portion of the field involving power plants which do not rely upon internal combustion engines.

BACKGROUND OF THE INVENTION

In the early years of the development of land vehicles which were powered other than by horse, some initial steps were made with the use of steam generating power plants. The development of gasoline brought about the development of the internal combustion engine using this fluid and the apparent abundance of this fluid for power source dictated the general development of power plants for land vehicles. There were experiments made with the use of electric automobiles but as with their counterparts today, the lack of range of such vehicles together with a lack of sufficient power to produce any relative speed finally resulted in their general exclusion from the market. There was a redevelopment of the use of steam driven land vehicles. One of the more notable was that of the Stanley. These cars were powered by steam and could provide a reasonable amount of range and adequate speed. In fact, the speed was governed only by the willingness of the driver to open the throttle to its limit. The steam automobile was also faced with the problem of excess pressure which resulted in explosion of the power plant and so it also fell into disuse.

Concerns about the effects of the environment from the pollutants from the exhaust fumes from the internal combustion engine aided by the increase in price of petroleum brought about a renewed interest in the development of power plants for land vehicles which do not rely upon an internal combustion engine. The electric powered vehicle again came into consideration but the present commercial state of the art as far as commercially available battery power sources has generally restricted the development of such electric powered vehicles.

There is obviously a need for a type of power plant which is independent of the requirement for internal combustion engines and which, like the electric powered automobile, will not provide pollutants. There is a requirement to develop a power plant which can utilize the motion of the vehicle in some form to regenerate power to prolong the range of the vehicle. It is readily apparent that, with the present technology, it is probably not possible for regeneration of enough power as is expended in moving the vehicle to prolong this range. This would, in effect, almost be a perpetual motion operation and considering at least the forces of friction which are involved, this is not feasible. Some attempt is being made in the field of regeneration of power in the case of electric powered vehicles in that some of the braking systems are designed to regenerate braking systems to restore some power to the batteries.

SUMMARY OF THE PRESENT INVENTION

The present invention utilizes a power system based upon the use of compressed air. Each wheel of the vehicle is provided with a motor which is operated by compressed air from a respective storage tank through a system of valves and hydraulic or fluid pressure lines. The rotation of each wheel is also utilized to drive air compressors which may recapture some or all of the air which is exhausted from each motor and additionally to compress and store air brought in from outside of the vehicle during its motion. The present invention can be adapted for two-wheel drive or four-wheel drive.

The drive units for each wheel are substantially identical. The rear units are mounted on fixed axles whereas the front units are mounted on an axle having a universal joint therein and each wheel is mounted by means of a ball joint to a suspension frame which in turn is secured to the vehicle frame. The suspension means for all wheels can be of a well-known type such as coil springs, leaf springs and other well-known suspension and load cushioning devices now in use. The rear wheel units are mounted on suspension systems similar to that for the front wheel which systems are in turn secured to the main vehicle frame and the wheels are suspended within the suspension frames with load cushioning devices similar to those on the front wheels.

Each driving unit of the present invention consists of a wheel with a combined axle and shaft secured thereto, a rotary power unit supplying to the shaft, braking assembly and an air compressor unit powered by the rotation of the respective shaft a compressed air tank for both delivery of contents for the motor unit and to receive the compressed air from the compressor.

Each wheel unit or driving unit is interconnected appropriately by necessary conduits for the flow of compressed air into and from the unit. Each unit is connected by valves and conduits to a combined throttle and control assembly which permits selection of either front wheel, rear wheel or four wheel drive as well as forward and reverse motion of the vehicle.

The steering mechanism of the vehicle of the present invention is of a conventional type. Similarly the electrical system would comprise a conventional battery with alternator or generator operated by one of the drive units together with necessary illumination system in order to comply with current regulations concerning such. If desired power assist for steering and/or braking could be provided by conventional systems which again can be operated by rotation of one or more of the axles of any of the drive units.

BRIEF DESCRIPTION OF THE DRAWINGS

The present invention can be shown and illustrated in the following drawings.

DETAILED DESCRIPTION OF THE INVENTION

Figure 1:
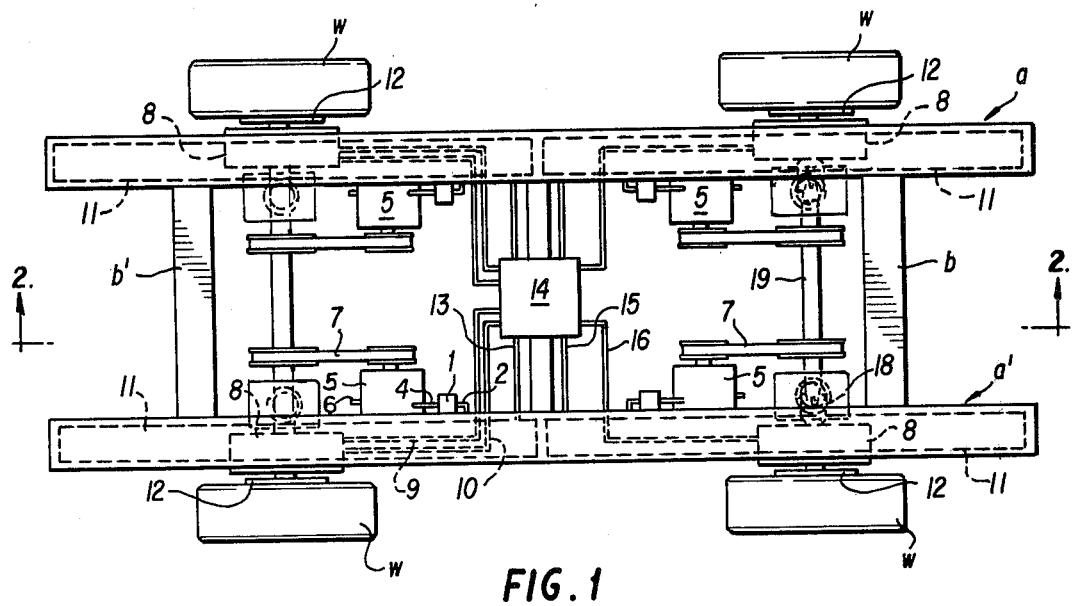
FIG. 1 is a plan view of a schematic drawing of a vehicle frame, wheels and axles and portion of the driving components of the present invention.
Figure 2:
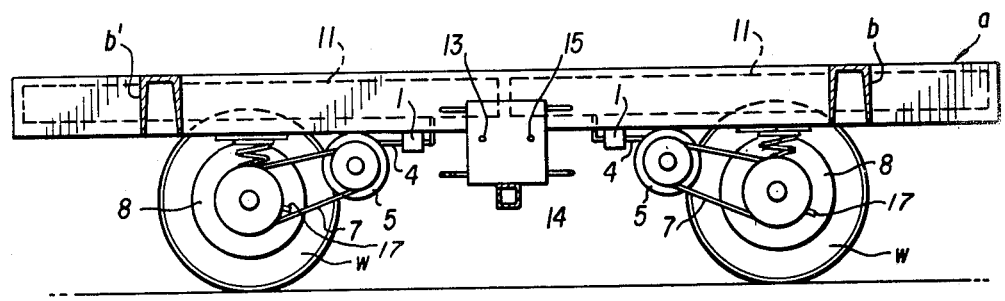
FIG. 2 is an elevation view along plane 2—2 of FIG. 1 of the schematic presentation of the present invention.
Figure 3:
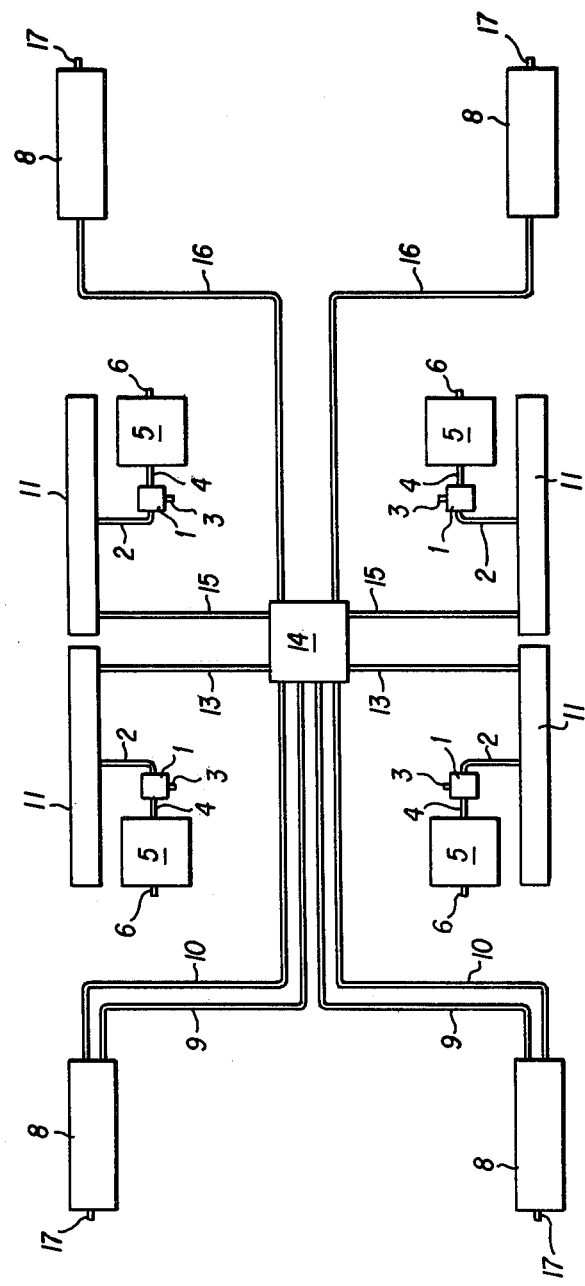
FIG. 3 is a schematic drawing of the actual power system of the present invention.

Referring now to FIGS. 1, 2 and 3, the principle components of the present invention will be described. In the scene in FIGS. 1 and 2 the invention in its simplest form would consist of a body frame having two longitudinal members a and a' interconnected at their end portions by cross members b and b'. The frame members may be of channel cross section or box section or such other construction as would be appropriate to those with skill in the art. The frame is provided with four conventional wheels w which preferably should be of as light-weight construction as is available. For each wheel is provided a brake assembly 12 which may be of the disc or drum type as conventionally provided in present day automobiles. Each drive unit consists of its wheel w, compressed air motor 8 and their respective compressed air storage tank 11, compressor assembly line axle and drive shaft 19. While indicated as being separate driveshaft-axle components, the axles could be substantially one piece providing a form of slip coupling was inserted mid point in order to compensate for the variations in rate of rotation of wheels during turns.

The compressor units consist of the compressor 5, the necessary pulleys on the compressor and the drive shaft and belt 7, a relief valve 3 between the compressor and the storage tank 11, conduit 2 interconnecting relief valve 3 with the storage tank 11 and conduit 4 between the compressor and the relief valve and inlet conduit 6 for the compressor. Combined accelerator and drive selector 14 is positioned generally centrally of the frame and would be adjacent the driver's position similarly to what is found in conventional vehicles having floor mounted gearshifts or automatic transmissions. The controller 14 is interconnected to each of the compressed air tanks 11 servicing the front drive units by conduits 15. Similarly, the controller 14 is connected to the respective air tanks servicing the rear drive units by conduit 13. The general structure and detailed operation of the controller 14 will be explained subsequently. However, at this time it is sufficient to say that the controller provides for either forward motion by the vehicle with either two or four wheel drive or rearward motion of the vehicle utilizing only the rear drive units. A neutral position is also provided.

With this concept of drive selection, the controller is connected to each of the front drive units by a conduit 16 and provides a flow of compressed air to these drive units only when forward motion is to be imparted to the vehicle. These conduits will provide the flow of compressed air to the forward drive units during either two or four wheel drive in a forward direction. To provide the supply of compressed air to the rear drive units during four wheel drive forward motion, the controller 14 is connected to each of the rear drive units by conduit 10. To provide for rearward motion of the vehicle, compressed air is furnished only to the rear drive units and to accomplish this, the controller 14 is connected to each of the rear drive units by conduits 9.

As seen in FIG. 1, each of the forward drive units is provided with a universal joint connection between its drive axle 19 and the combined shaft and axle 8 for each forward drive unit.

Figure 4:
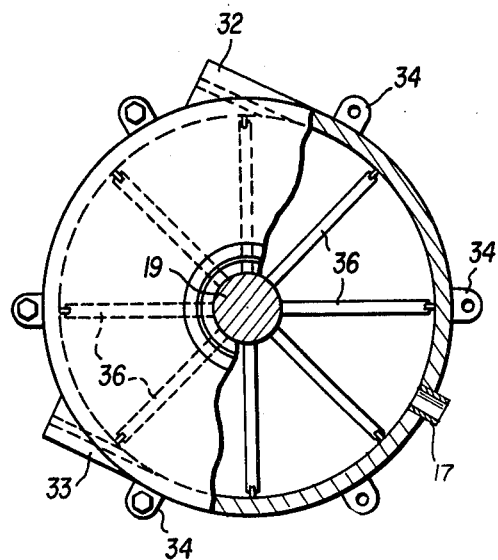
FIG. 4 is an elevation view in partial section of the driving motor of the present invention.
Figure 5:
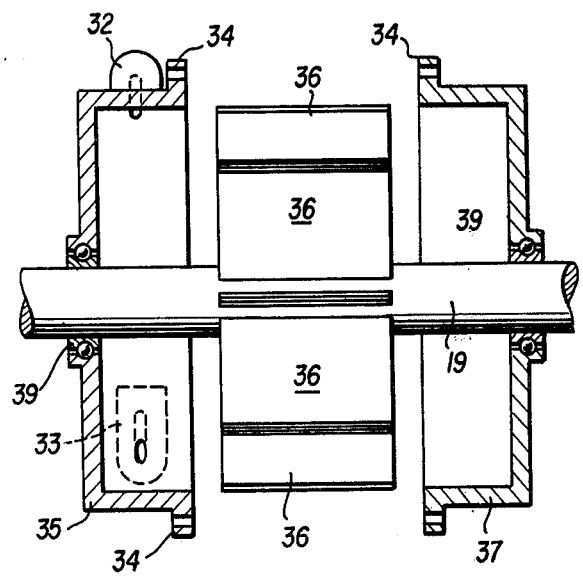
FIG. 5 is an elevation view in partial section of the driving unit shown in an expanded configuration.
Figure 6:
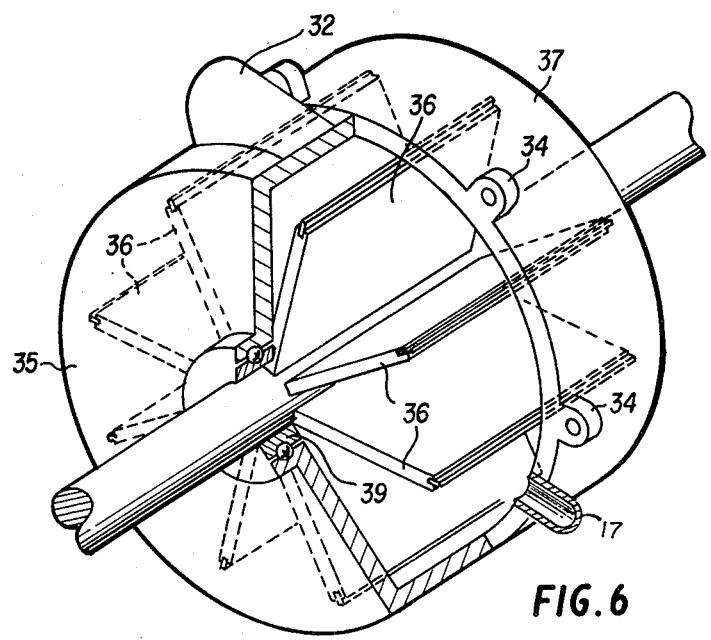
FIG. 6 is a prospective view in partial section of the assembled power plant for each wheel.

Referring now to FIGS. 4, 5 and 6 will be seen the axle motor unit of the present unit which utilizing the compressed air furnished to the conduits 16, 9 and 10 can provide the forward and/or reverse motion of the present vehicle. The motor unit consists of two housings 35 and 37 which are joined together through a plurality of locking lugs 34 and into which are inserted conventional bolts and nuts in sealing and tightening engagement. The two housings encompass the rotor blades 36 of which there are a plurality as shown in the drawings. The rotor blades 36 may contain at their peripheries sealing elements to provide appropriate air tight seals between the rotor blades 36 and their respective housings 35 and 37. The rotor blades 36 are inserted over the combined axle drive shaft 18 by means of a conventional supply and arrangement. Each motor unit is provided with at least one air inlet 32 which is connected to an appropriate conduit such as 16, 9 or 10 and at least one exhaust conduit 17 positioned between inlets 32 and 33 in said housings. Inasmuch as the motor units are readily replaceable between front wheel drive units and the rear wheel drive units, their construction is identical. The motion of the drive unit as to forward drive or rear drive is entirely dependent upon the supply of air provided by the controlled unit 14.

To provide for a reverse movement of the vehicle regardless of whether the units are or have been interchanged there is provided inlet 33. The inlet 33 is connected to the appropriate conduit 9 emanating from the control unit 14. To ensure that the drive unit 8 has the necessary air tight integrity, the units 35 and 37 are provided on their outer surfaces with a journal assembly 39 which includes not only a bearing component but also a sealing component surrounding the bearing component so that when the assemblies 35 and 37 are connected together through the lugs 34 the unit is completely sealed about the rotor elements 36.

Figure 9:
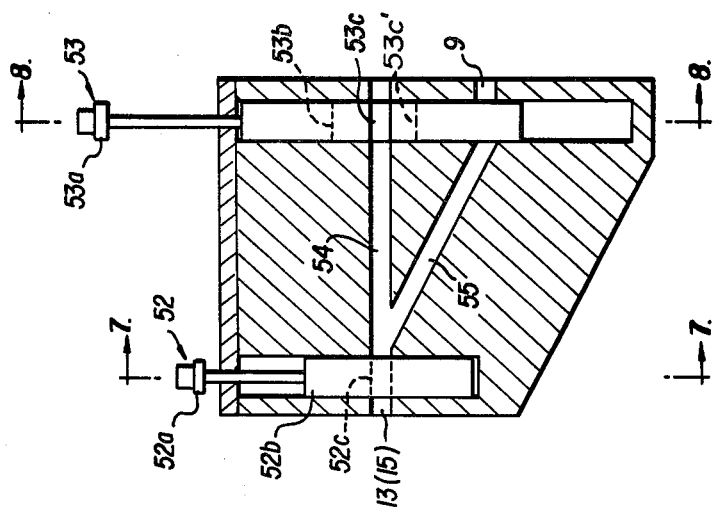
FIG. 9 is a schematic presentation of the control system for two-wheel and four-wheel drive.
Figure 7:
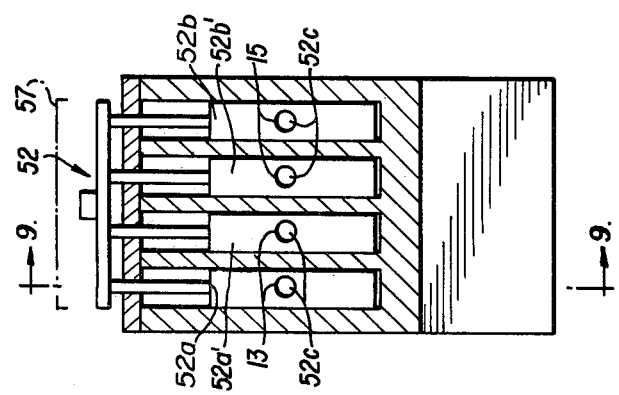
FIG. 7 is a schematic drawing in partial cross section of the forward motion drive control.

The combined acceleration or speed control and drive selector 14 as shown schematically in FIGS. 1 or 3 and 7 to 9 can be considered to be most likely a generally cubic control element. Within this element there are two separate control levers. Lever assembly 52 as seen in FIGS. 7 and 9 is the acceleration or speed control. As indicated in FIG. 7, the speed control component of this unit provides four valve units, one for each of the conduits 13 leading from the compressed air storage tanks 11 for the rear drive units and a similar pair of valve units for the conduits 15 leading from the compressed air storage units for the forward drive units. The acceleration or speed control element 52 is designed to provide simultaneous control of the flow of compressed air to the forward and rear drive unit. In this connection it can be seen in FIG. 7, as shown schematically, the control unit comprises the two valves 52a and a' relating to the conduits from the storage tanks for the rear drive units and the two valves 52b and b' relating to the respective conduits 15 leading from the compressed air storage tanks for the forward drive unit. Each of these valve units is provided with an aperture or opening 52c which is identical in size and configuration for all four of the valve elements.

As seen in FIG. 7 and again in FIG. 9 the acceleration control or speed element control lever 52 is shown in its most advanced position which will allow the maximum flow of compressed air from the respective air storage cylinders to the respective drive units. Obviously with the type of construction illustrated and outlined above, the valves will be provided with adequate and appropriate sealing means to prevent the escape of the compressed air from this component of the combined control unit 14. It would also be apparent to those with skill in the art that as the controller 52 is raised, the amount of air pushed in past through the openings 52c in the valve 52a, 52a', 52b and 52b' will be reduced thus providing for the control of the rotation of the respective drive motors 8 for both the forward and rear drive units.

As seen in FIG. 9 the compressed air from the storage tanks after passing through the acceleration or speed control level assembly 52 then passes through a conduit 54 in the body of the combined unit 14 in a series of parallel channels which for convenience sake may be designated as 54, 54', 54'', 54'''. These channels lead to the drive selector assembly of the combined unit 14 which again comprises a control lever assembly 53 designed to move in a vertical aspect in the body of the combined unit 14. This is evident from FIGS. 8 and 9. The drive selector element 53 again provides four valve elements which relate to the respective channels 54-54'''. Again the drive selector control element is designed to move in a vertical path. The need for controlling the extent of movement can be of any of the conventional means which would be well known to those with skill in the art including means to temporarily lock or secure the control rod assembly 53 in various vertical positions relative to the body of the control element 14.

Figure 8:
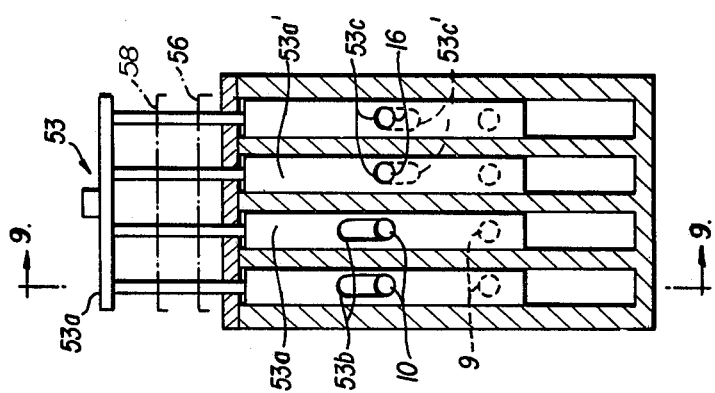
FIG. 8 is a schematic representation of the motion control for neutral and reverse direction.

As seen in FIG. 8, it will be apparent that the drive selector lever assembly 53 carries four valve elements which are substantially identical except for the valve openings themselves. It will be seen that the two left hand valve elements 53a have elongated apertures 53b in each of them whereas the two valve elements 53a' on the right have only circular valve openings 53c. The valve openings 53c correspond in size to the diameter of the conduit 16 which lead from the control unit 14 to the forward drive units. The valve openings 53b in the left hand pair of valve elements 53a are elongated because they must not only provide for a line flow of the compressed air from conduits 13 through the control unit to the rear drive units by means of conduits 10 but in a selective mode, they must provide for closure of flow of compressed air into conduits 10 and divert it instead into conduits 9 to provide for the reverse movement of the vehicle.

The diversion of the compressed air from channel conduits 10 and, depending upon the mode as to whether the unit is in four-wheel or two-wheel drive conduit 16 can be seen that there is a conduit 55 which branches off from the conduit 54 in the control element 14 which leads down to the conduits 9 which relate to the reverse movement of the vehicle.

It should also be noted that when it is desired to go into rearward motion, the single downstroke of the control lever assembly 53 simultaneously cuts off the flow of the compressed air through conduits 16 into the front wheel drive and forward drive as well as cutting off the flow of compressed air through conduits 10 to the rear motors which were then in forward motion drive.

As can be seen in FIG. 7 it is only necessary to raise the control lever assembly 52 in order to simultaneously shut off the flow of compressed air from the respective air storage cylinders to the control unit 14. This in effect puts the vehicle into a neutral drive position.

Referring now to FIG. 8, it can be seen that to change the mode of operation to four-wheel drive that the control rod assembly 53 would be in a position as shown. Lowering the rod to a position indicated by line 58 would shut off the flow of compressed air through conduit 16 to the forward drive motor while still maintaining the flow of compressed air to conduits 10 into the rear drive motors. Further lowering the control lever assembly 53 to the position indicated indicated as 56 would cut off the flow of the compressed air into conduits 10 and in turn open up conduits 9 so that the vehicle could be moved in reverse.

OPERATION OF THE INVENTION

The movement of the vehicle of the present invention will be described in the following manner. With the acceleration or speed control valve assembly 52 in a position indicated in FIG. 7 by the plane 57 the vehicle will be in a neutral position inasmuch as the flow of fluid from the respective compressed air storage cylinders for each of the forward and rear drive units has been shut off. The decision next is whether the vehicle will proceed in the four-wheel drive forward motion or the two-wheel drive forward motion. If the position of the vehicle and the gradient of the highway upon which the vehicle is placed would indicate a favorable use of the two wheel drive unit, with reference to FIG. 8, the drive selector control lever 53 is moved to the position indicated by the plane 58 in FIG. 8. This will activate only the rear drive units. To initiate forward motion of the vehicle the acceleration or speed control lever assembly 52 is then lowered to the position shown in FIG. 7. This permits the fluid to flow from the respective compressed air storage cylinders for the rear drive units. At the same time the compressor units 5 for the rear drive units continue to be activated to provide an intake of air from outside the vehicles to begin to restore the air in the respective rear drive unit compressed air cylinders 11. Should the gradient of the highway indicate that the vehicle will require four wheel drive, that is drive from both the forward and rear drive units, the drive selector control level assembly 53 is moved into the position shown in FIG. 8. As the vehicle proceeds down the highway or along its respective surface, and it appears that it will not be necessary to continue to require the drive from both the forward drive units and rearward drive units, the drive selector control lever 53 may then be lowered to the position indicated by the plane 58 in FIG. 8. It should be understood that at this time the fact that the forward drive units are no longer involved in the propulsion of the vehicle does not mean that the respective compressor units 5 for these forward drive units are no longer in operation. In fact they continue to operate and to restore the pressure of the air in those respective air storage units. Should the pressure within these respective air storage units 11 become excessive, the pressure relief valves 3 for each of these drive units then go into operation and vents the excess pressure to the atmosphere. It would be appreciated by those with skill in the art that it would be quite apparent that should such a situation arise as was previously described that adequate signalling elements would be provided to indicate to the driver that the respective air storage cylinders had reached their maximum capacity. This being the case, it would be the option of the operator of the vehicle to shift the drive selector control unit 53 into a position where he could utilize the propulsion potential presented by the storage cylinders 11 for the forward drive units so as to then diminish the requirement for the use of the drive from the rear drive units. Based upon the disclosure of the principle of operation to distinguish between the use of the four-wheel drive and the two-wheel drive embodying only the rear drive units, it is apparent that by an elongation of the circular conduit openings 53c which relate to the supply of compressed air to the forward drive units within the control unit 14 as seen in FIG. 8 to that shown as 53c' that it is equally within the scope of the present invention to withdraw the forward drive of the rear units and to rely entirely upon the driving force provided by the forward drive units.

Thus, it is evident that during the operation of the vehicle of the present invention with particularly only a two wheel drive, albeit it a drive from the forward drive units or from a rearward drive unit, the option is offered to the operator of the vehicle to restore the pressures within the air storage tanks for the non-operative drive units be they forward or rear while the storage tanks for the drive units then engaged in propelling the vehicle are also in the process of being at least partially replenished. It is clearly evident that the replenishment of the capacity of the air storage tanks 11 for the drive units not in operation provides an additional prolongment of the range of the vehicle even though the air storage units for the drive units then propelling the vehicle are in a sense at least partially rebuilding their own capacities.

It will be apparent to those with skill in the art that the present invention not only provides an unusual means for providing a land vehicle with both forward and reverse means but also one which is a regenerative potential as regards the restoration of the source of propulsion for the respective drive units. It will also be apparent to those with skill in the art of utilizing fluid pressures to control the movement of mechanical components which are driven by the fluid pressure that such units as described herein may be equally applicable to other vehicles or devices requiring motive power.

What is claimed is:

1. A combined velocity and direction of motion unit for a propulsion device activated by fluid pressure comprising: a housing; a velocity control assembly positioned in one end portion of said housing with inlet and outlet ports in said one end portion; a direction of motion assembly positioned in the other end portion of said housing with first inlet and outlet ports in said other end portion in its upper part and second inlet and outlet ports in the lower part of said other end portion; a first plurality of conduits between the outlet ports of said one end portion and the first inlet ports of said other end portion; and a second plurality of conduits between said first plurality of conduits and said second inlet ports in said other end portion.

2. The combined unit according to claim 1 wherein said one end portion contains a plurality of vertical chambers arranged side-by-side in spaced relationship between respective inlet and outlet ports in said portion and said velocity control assembly comprises an equal plurality of valve rods in said chambers which rods are adapted for simultaneous movement within said chambers, each of said rods having an orifice therethrough which may be selectively interposed between the respective inlet and outlet port for each of said chambers to control the volume of pressurized fluid passing through said one end portion.

3. The combined unit according to claim 1 wherein said other end portion contains a plurality of vertical chambers arranged side-by-side in spaced relationship between said first and second inlet and outlet ports and said direction of motion assembly comprises and equal plurality of valve rods in said chambers which rods are adapted for simultaneous movement within said chambers, each of said rods having an orifice therethrough which may be selectively interposed between the respective first and second inlet and outlet ports for each of said chambers to allow the flow of pressurized fluid through all of said chambers simultaneously from said first plurality of conduits, at least one pair of adjacent valve rods having their orifices selected from the group of an elongated orifice and two selectively spaced orifices so that said at least one pair of valve rods may be selectively interposed between their respective first and second inlet and outlet ports to allow the flow of pressurized fluid only through those ports while shutting off the flow of pressurized fluid through the respective inlet and outlet ports of said other pair of valve rods.

4. The combined unit according to claim 3 wherein the first outlet ports of said other end portion are connected by conduits to fluid driven propulsion units to impart rotation of said units in one direction and said second outlet ports of said other end portion are connected by separate conduits to said propulsion units to impart rotation of said units in the opposite direction.

5. A pneumatically driven land vehicle comprising: a frame upon which may be secured a body of a suitable type; a first pair of propulsion units for said vehicle mounted with appropriate suspension means and steering means on one end portion of said frame and a second pair of propulsion units mounted with appropriate suspension means on the other end portion of said frame, each propulsion unit comprising a ground contacting assembly of a wheel, axle and braking means, a rotary driving unit secured to said axle and connected to a rechargeable source of compressed air and compressor means driven by said axle to supply compressed air to said source; and a unit for combined velocity control, selector of forward or reverse movement of the vehicle and determinant of activation of one or both pairs of said propulsion units, said unit being mounted on said frame and connected by a first conduit to each of said rechargeable sources, by a second conduit to each of said propulsion units to supply compressed air for forward movement and by a third conduit to each of said second pair of units to supply compressed air for reverse movement, said unit comprising a housing; a velocity control assembly position in one end portion of said housing with inlet and outlet ports in said one end portion; a direction of motion assembly positioned in the other end portion of said housing with first inlet and outlet ports in said other end portion in its upper part and second inlet and outlet ports in the lower part of said other end portion; a first plurality of conduits between the outlet ports of said one end portion and the first inlet ports of said other end portion; and a second plurality of conduits between said first plurality of conduits and said second inlet ports in said other end portion, said second conduits to said propulsion units being connected to said first outlet ports in said other end portion, said third conduits to said second pair of propulsion units being connected to said second outlet ports in said other end portion.

6. The combined unit according to claim 5 wherein said one end portion contains a plurality of vertical chambers arranged side-by-side in spaced relationship between respective inlet and outlet ports in said portion and said velocity control assembly comprises an equal plurality of valve rods in said chambers which rods are adapted for simultaneous movement within said chambers, each of said rods having an orifice therethrough which may be selectively interposed between the respective inlet and outlet port for each of said chambers to control the volume of pressurized fluid passing through said one end portion.

7. The combined unit according to claim 5 wherein said other end portion contains a plurality of vertical chambers arranged side-by-side in spaced relationship between said first and second inlet and outlet ports and said direction of motion assembly comprises and equal plurality of valve rods in said chambers which rods are adapted for simultaneous movement within said chambers, each of said rods having an orifice therethrough which may be selectively interposed between the respective first and second inlet and outlet ports for each of said chambers to allow the flow of pressurized fluid through all of said chambers simultaneously from said first plurality of conduits, at least one pair of adjacent valve rods having their orifices selected from the group of an elongated orifice and two selectively spaced orifices so that said at least one pair of valve rods may be selectively interposed between their respective first and second inlet and outlet ports to allow the flow of pressurized fluid only through those ports while shutting off the flow of pressurized fluid through the respective inlet and outlet ports of said other pair of valve rods.

* * * * *